United States Patent [19]
Doyle

[11] Patent Number: 5,394,563
[45] Date of Patent: Mar. 7, 1995

[54] ANTI-G GARMENT FABRIC

[76] Inventor: Brian P. Doyle, 340 Shays St., Amherst, Mass. 01002

[21] Appl. No.: 592,464

[22] Filed: Oct. 1, 1990

[51] Int. Cl.$^6$ .................................... A62B 17/00
[52] U.S. Cl. .................................. 2/2.11; 2/2.13; 2/2.14; 2/DIG. 3; 2/DIG. 10; 139/420 A; 139/420 R; 428/225; 428/229; 428/257; 428/258; 428/260; 428/267; 428/265; 428/373; 428/902
[58] Field of Search ............... 428/257, 258, 245, 373, 428/229, 902, 225, 260, 265, 267; 139/420 A, 420 R, 383 R, 389; 139/383 R, 389; 2/DIG. 3, DIG. 10, 2.11, 2.13, 2.14; 114/103

[56] References Cited
U.S. PATENT DOCUMENTS

| | | | |
|---|---|---|---|
| 4,089,065 | 5/1978 | McGee | 2/DIG. 3 |
| 4,590,121 | 5/1986 | Mahr | 428/258 |
| 4,674,479 | 6/1987 | Jennings et al. | 2/DIG. 3 |
| 5,091,247 | 2/1992 | Willibey et al. | 428/258 |

Primary Examiner—James J. Bell
Attorney, Agent, or Firm—Cushman, Darby & Cushman

[57] ABSTRACT

A low stretch fabric for use in inflatable devices that place pressure on body parts, such as anti-G garments. The novel design of the present invention allows it to inflate to a lesser volume, than conventional fabrics, while maintaining the same pressure. This results in faster response times and less bulk of the garment constructed of the present invention.

32 Claims, 13 Drawing Sheets

FIG. 1

|  | ENDS | PIC | WARP YARN | FILL YARN | DEN RAT | WARP DENS | FILL DENS | WARP TOT | FILL TOT | DEN TOT | WGHT PRED |
|---|---|---|---|---|---|---|---|---|---|---|---|
| EXAMPLE 1 | 121 | x 38 | 220 | x 440 | 2 | 1795 | 797 | 26620 | 16720 | 43340 | 6.42 |
| EXAMPLE 2 | 122 | x 40 | 200 | x 400 | 2 | 1725 | 800 | 24400 | 16000 | 40400 | 5.99 |
|  | 122 | x 45 | 200 | x 400 | 2 | 1725 | 900 | 24400 | 18000 | 42400 | 6.28 |
|  | 122 | x 50 | 200 | x 400 | 2 | 1725 | 1000 | 24400 | 20000 | 44400 | 6.58 |
|  | 122 | x 35 | 200 | x 600 | 3 | 1725 | 857 | 24400 | 21000 | 45400 | 6.73 |
|  | 122 | x 40 | 200 | x 600 | 3 | 1725 | 980 | 24400 | 24000 | 48400 | 7.17 |
| EXAMPLE 4 | 122 | x 38 | 200 | x40/4 | 2.7 | 1725 | 876 | 24400 | 20216 | 44616 | 6.61 |
|  | 122 | x 45 | 200 | x40/4 | 2.7 | 1725 | 1038 | 24400 | 23940 | 48340 | 7.16 |
|  | 122 | x 33 | 200 | x16/2 | 3.3 | 1725 | 850 | 24400 | 21912 | 46312 | 6.86 |
|  | 122 | x 39 | 200 | x16/2 | 3.3 | 1725 | 1005 | 24400 | 25896 | 50296 | 7.45 |
|  | 106 | x 31 | 40/2 | x16/2 | 2.5 | 1729 | 799 | 28196 | 20584 | 48780 | 7.23 |
|  | 106 | x 35 | 40/2 | x16/2 | 2.5 | 1729 | 902 | 28196 | 23240 | 51436 | 7.62 |
|  | 106 | x 39 | 40/2 | x16/2 | 2.5 | 1729 | 1005 | 28196 | 25896 | 54092 | 8.01 |
|  | 130 | x 46 | 30/1 | x36/2 | 1.7 | 1730 | 791 | 23010 | 13616 | 36626 | 5.43 |
|  | 130 | x 52 | 30/1 | x36/2 | 1.7 | 1730 | 895 | 23010 | 15392 | 38402 | 5.69 |
|  | 130 | x 58 | 30/1 | x36/2 | 1.7 | 1730 | 998 | 23010 | 17168 | 40178 | 5.95 |
|  | 130 | x 35 | 30/1 | x20/2 | 3 | 1730 | 807 | 23010 | 18620 | 41630 | 6.17 |
|  | 130 | x 39 | 30/1 | x20/2 | 3 | 1730 | 900 | 23010 | 20748 | 43758 | 6.48 |
|  | 130 | x 43 | 30/1 | x20/2 | 3 | 1730 | 992 | 23010 | 22876 | 45886 | 6.80 |
|  | 124 | x | 22/1 | x | 0 | 1929 | 0 | 30008 | 0 | 30008 | 4.45 |
| POLYESTER SAILCLOTH (PRIOR ART) |
| 6.6 OZ. | 146 | x 56 | 140 | x 440 | 3.1 | 1727 | 1175 | 20440 | 24640 | 45080 | 6.68 |
| 6.5 OZ. | 131 | x 60 | 180 | x 350 | 1.9 | 1758 | 1122 | 23580 | 21000 | 44580 | 6.60 |

ENDS = WARP YARNS PER INCH
PICS = FILL YARNS PER INCH
DEN RAT = DENIER RATIO
WARP DENS = WARP DENSITY (SQRT OF DENIER)*WARP COUNT
FILL DENS = FILL DENSITY (SQRT OF DENIER)*FILL COUNT
WARP TOT = TOTAL DENIER PER INCH OF WARP
FILL TOT = TOTAL DENIER PER INCH OF FILL
DEN TOT = TOTAL DENIER PER SQUARE INCH
WGHT PRED = APPROXIMATE PREDICTED WEIGHT OZ./SQ. YD.

FIG. 2

| TEST | EXAMPLE 2 | EXAMPLE 4 | PRIOR ART | UNITS |
|---|---|---|---|---|
| TENACITY 1" RAVEL BREAK | | | | |
| W | 252 | 253 | 185 | LBS. |
| F | 156 | 138 | 160 | LBS. |
| TEAR ASTM TONGUE TEAR | | | | |
| W | 25.5 | 22.6 | 13.0 | LBS. |
| F | 28.6 | 28.1 | 13.0 | LBS. |
| ABRASION TABOR | 500 | 400 | | CYCLES |
| WEIGHT | 5.7 | 6.3 | 5.2-5.6 | OZ./SQ.YD. |
| THICKNESS | 0.013 | 0.015 | | INCHES |
| POROSITY | 4.75 | 6.35 | 12 | CU.FT./MIN. |
| SHRINKAGE | | | | |
| W | 2.0 | 2.1 | 2.0 | PERC. |
| F | 1.1 | 0.3 | 2.0 | PERC. |
| FINISHED COUNT | | | | |
| ENDS | 124 | 124 | 98 | |
| PICS | 40 | 40 | 90 | |

CONSTRUCTION; 122x40 200x400 FILAMENT
CONSTRUCTION; 122x39 200x40/4 SPUN FILL
MIL-C-81814-B (PRIOR ART)

FIG. 8

| FABRIC | MIL-C-83429A (PRIOR ART) | EXAMPLE 1 | EXAMPLE 2 | EXAMPLE 4 |
|---|---|---|---|---|
| 1 PSI INFLATION | | | | |
| WAIST (6LBS./IN.) | 3.78% | 0.19% | 0.19% | 0.38% |
| THIGH (3.5LBS./IN.) | 2.44% | 0.11% | 0.11% | 0.22% |
| CALF (2.5LBS./IN.) | 2.09% | 0.09% | 0.09% | 0.19% |
| 2 PSI INFLATION | | | | |
| WAIST (12LBS./IN.) | 6.25% | 0.41% | 0.38% | 0.83% |
| THIGH (7LBS./IN.) | 4.66% | 0.25% | 0.23% | 0.50% |
| CALF (5LBS./IN.) | 3.50% | 0.17% | 0.16% | 0.34% |

HOOP STRESS = THE MAJOR STRESS IN AN INFALTED CYLINDER.
CIRCUMFERENTIAL STRESS. IN THIS EXAMPLE;
HOOP STRESS PER INCH = (DIAMETER)(PRESSURE)/2

FIG. 10

| GARMENT | CSU-13/P (CUT-AWAY) | CSU-13/P (CUT-AWAY) | PROTOTYPE HIGH COVERAGE | UNITS |
|---|---|---|---|---|
| FABRIC | MIL-C-83429A (PRIOR ART) | EXAMPLE 1 FABRIC | EXAMPLE 2 FABRIC | |
| CIRCUMFERENCE | | | | INCHES |
| WAIST | 37.94 | 38.00 | 36.16 | |
| LEFT THIGH | 22.69 | 22.44 | 21.38 | |
| RIGHT THIGH | 22.06 | 22.13 | 21.50 | |
| LEFT CALF | 16.75 | 15.13 | 15.50 | |
| RIGHT CALF | 16.50 | 15.44 | 15.13 | |
| TOTAL VOLUME 3 PSI | 606 | 491 | 520 | CUBIC INCHES |
| FREE VOLUME 0.5 PSI | 751 | | 1155 | CUBIC INCHES |
| WEIGHT | 3.00 | 2.88 | 2.00 | POUNDS |

ANTI-G GARMENT FABRIC

BACKGROUND OF THE INVENTION

Field of the Invention

The present invention relates to improved fabrics for use in anti-G garments worn by pilots of high performance aircraft. In particular, the present invention is a low stretch fabric, for use in an anti-G garment, with which the garment will inflate to a lesser volume, while applying appropriate forces to the wearer in order to counter the effects of G forces to which the wearer is exposed. The lower inflation volume allows the anti-G garment of the present invention to be less cumbersome and respond more rapidly to changes in G forces encountered by pilots than conventional anti-G garments.

Description of Related Art

When an aircraft is turned, the radial acceleration acting on the mass of the pilot is experienced as an increase in force in a direction perpendicular to the plane defined by the aircraft wings and fuselage. The passengers and pilot are pressed into their seats. The acceleration associated with this force is known as G forces, or simply G's. Modern fighter, and other high performance, aircraft which are very agile and can turn very sharply, commonly generate accelerations as high as 9 or more G's (9 times the acceleration of gravity). This acceleration creates hydrostatic forces in the pilot's cardiovascular system which tend to decrease the supply of blood to the eyes and brain, causing loss of vision, known as black-out, and even loss of consciousness (GLOC, G induced loss of consciousness).

G induced loss of consciousness and degradation of aircrew performance under stress are very important, life threatening, problems faced in the employment of modern, high performance, aircraft. While pilots of these aircraft are trained to use muscular straining techniques to increase the flow of blood to the head, these straining maneuvers are inadequate and must be augmented by the use of anti-G garments. These garments are tight fitting inflatable devices commonly covering the abdomen and legs. The garment is attached to a compressed air supply in the aircraft and is automatically inflated through a "G-suit" inflation valve. The pressure level of the inflation is usually proportional to the G being experienced. Some of the most modern anti-G garment systems include a vest coupled with positive pressure applied to the pilots oxygen mask in addition to G-pants for the abdomen and legs.

Two limitations to the useful performance of known anti-G garments are limited coverage over the surface of the body, and excessive inflation time. These limitations are being addressed by projects to design new garments with greater coverage areas, and to develop high flow and rate sensitive inflation valves to decrease response time. Both solutions can be complex and expensive.

At the present time these garments are typically made from two fabrics. The first, inner layer, fabric is a coated or laminated fabric with the coating applied to make the garment air tight and to provide a medium for heat-sealing the assembly seams. The second, outer layer, fabric is typically made from Nomex, a high temperature resistant polyamide yarn. Its purpose is to protect the wearer and inner layer from fire in the event of an accident, and to mechanically transmit the loads developed through inflation of the garment. Neither of these fabrics is designed for low stretch and, in fact, both stretch extensively in use.

SUMMARY OF THE INVENTION

The present invention addresses these problems using some novel fabric designs to decrease fabric stretch in anti-G garments. Decreased fabric stretch would lead to decreased inflated volume, and therefore, to more rapid inflation of the garment. The invention provides a simple solution to some G-stress problems which could be rapidly implemented in the field without more expensive, and complex, aircraft modifications.

It is anticipated that low stretch fabrics provided in accordance with the present invention will have other uses in other inflatable garments or devices which rely on fabric tension to transfer or transmit loads to a portion of the body, for example, M.A.S.T. (military anti-shock trousers) garments, and blood pressure measurement cuffs. Such devices could be designed for either human or animal use.

Therefore, it is an object of the present invention to provide a low stretch fabric for use in inflatable garments that have a lower inflation volume, and thus faster response time, than conventional garments while applying adequate pressure to the wearer's body. It is another object of the present invention to provide inflatable garments that are less cumbersome and distribute pressure over the body more evenly than conventional garments. It is further an object of the present invention to provide a low stretch fabric for use in other inflatable devices that are utilized for applying pressure on body parts.

BRIEF DESCRIPTION OF THE DRAWINGS

FIG. 1 is a table showing the design specifications of several preferred embodiments of the present invention;

FIG. 2 is a finishing laboratory report comparing the fabric of examples 2 and 4 with a prior art fabric;

FIG. 8 is a table of fabric elongation due to hoop stress comparing examples 1, 2, 4 and a prior art fabric;

FIG. 10 is a table of measurements of anti-G garments made of a prior art material, the fabric of example 1 and the fabric of example 2;

DETAILED DESCRIPTION OF THE PRESENT PREFERRED EMBODIMENT

Figure 3:
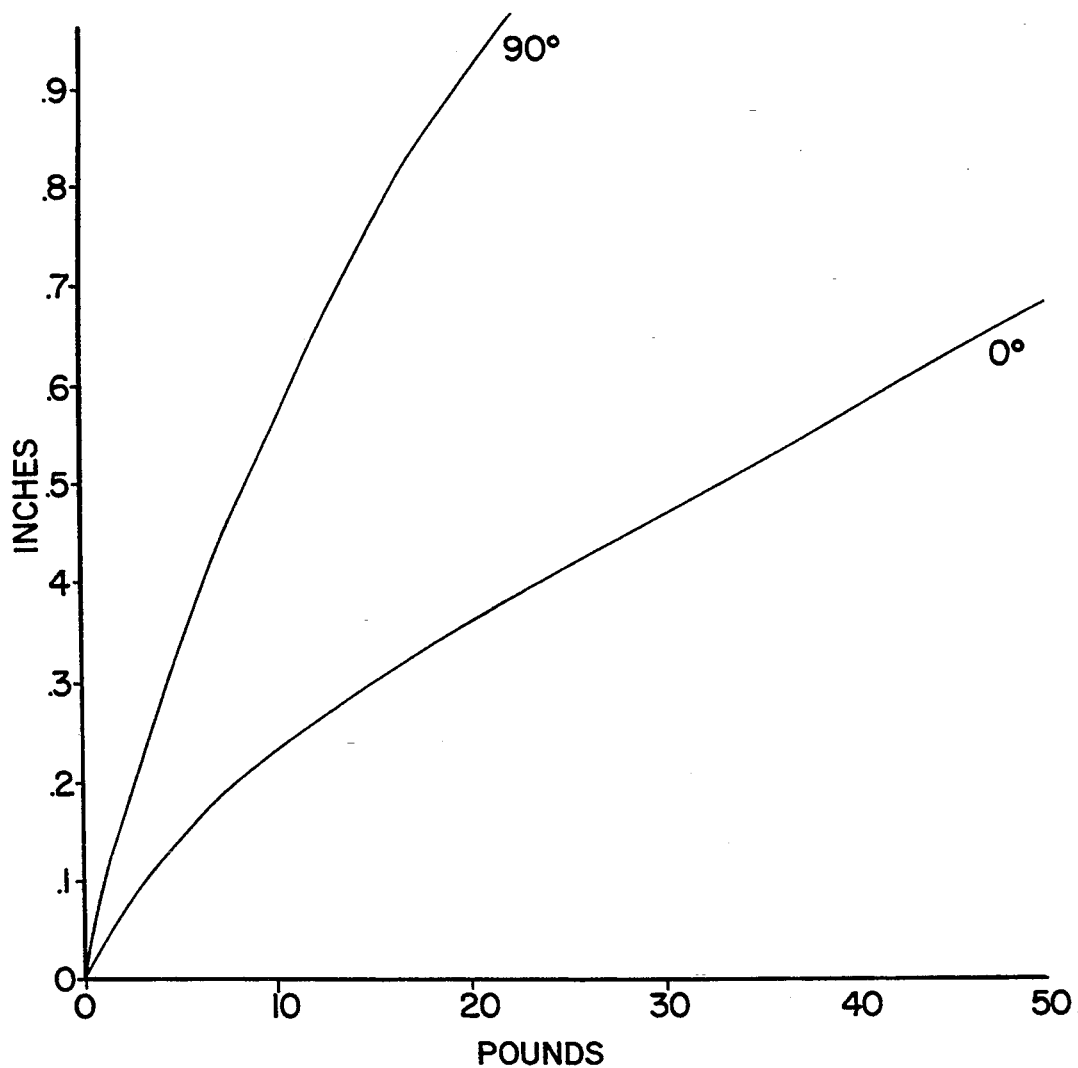
FIG. 3 is a graph of the stress/strain characteristics of a prior art fabric, MIL-C-83429A.

The present invention is achieved by the selection of a combination of yarn sizes, in both warp and filling, and yarn spacing (or count), in both warp and filling, and a type of weave which creates a condition of very low (nearly zero) crimp in either the warp or filling of the resulting fabric. It should be noted that it is not possible to achieve very low crimp in both directions simultaneously in the same woven fabric. Decreasing crimp in one direction necessarily will result in increased crimp in the other. A common error in textile design is to attempt to decrease the stretch of a fabric by using exotic, high performance, low stretch, yarn in an unsophisticated woven construction. The high performance yarn is then extensively crimped and its low stretch properties are essentially lost.

The success of the design depends, in part, on the type of yarn chosen i.e., spun, filament, plied, core spun, and the fiber i.e., natural, synthetic, polyester, glass, nylon, aramid, blends and others. In addition composite yarns may be used such as a yarn with an inner glass core and an outer sheath of nomex, or the like. The yarn used must have a modulus which is high enough to achieve the low stretch desired, and must be of high enough tenacity to avoid breaking under load. In many applications high temperature resistant yarn must be used to prevent injury to the wearer in the event of an accident and fire. Inter yarn friction can be important in the design of fabrics considered under the invention to prevent ravelling and fraying. This is especially true when fire resistant yarns, such as aramid (an aromatic polymide), are used, because resins and finishing chemicals which might be employed to prevent raveling and fraying would compromise the fire resistant properties of the fabric. To this end spun yarns, or a combination of spun and filament yarns may be used to increase inter yarn friction.

One of the most important yarn properties to be considered is bulk, or diameter. The diameter of the yarn in combination with the yarn count, or spacing, determines the packing density. The relative packing density between warp and filling can be used to control the distribution of crimp. For instance, a very tightly packed warp woven with a more loosely spaced filling will tend to promote crimp in the warp yarns and discourage crimp in the filling yarns. This effect can be enhanced if the diameter of the filling yarns is much larger than that of the warp. Fabric such a this would have its lowest stretch and therefore primary load carrying direction in the filling. It is important to consider these parameters and to orient the material properly- for each application. It is conceivable through adjustment of yarn weights, counts, and the other yarn parameters, to create a similar warp oriented fabric with the warp being the lowest stretch and therefore primary load carrying direction.

The packing density of a yarn system (warp, filling) can be characterized numerically by multiplying the count by the square root of the yarn weight (expressed in any common units, e.g. denier, decitex, yarn count). By knowing, through experience, some empirical value of packing densities in both the warp and filling of a given fabric, and associated yarn weight (denier) ratios, filling/warp, it is possible to predict the approximate level of crimp in both warp and filling. Above certain values of warp density, the filling will not crimp even with low denier ratios. It has been found empirically, that a warp density greater than 1700 is desirable. Thus a fabric with the desired low stretch characteristics can be designed.

The present invention includes the addition of air holding and/or heat-sealable coatings and laminated films applied to the special low stretch fabrics envisioned to facilitate the fabrication of inflatable garments and devices from these materials.

EXAMPLE 1

A polyester warp of 121 yarns per inch of 220 denier DuPont type 52 polyester is woven in a plain weave with a filling of 38 yarns per inch of 440 denier DuPont type 52 polyester. The warp is twisted to a level to promote efficient weaving on the type of loom selected. The high warp density of 1795 combined with the filling to warp yarn weight ratio of 2:1 (440/220) places most of the crimp in the warp and very little in the filling. Therefore this fabric has relatively very low filling stretch under load. The resulting fabric weighs 7.15 ounces per square yard. This fabric, using non-fire retardant and non-high temperature yarn, would be more appropriate for non-aviation uses such as MAST garments, blood pressure cuffs, or the like.

The fabric may be finished using standard procedures for polyester. The finishing steps might include scouring, resination with compounds such as urethane or melamine, heat setting, resin curing, and calendaring.

Figure 4:
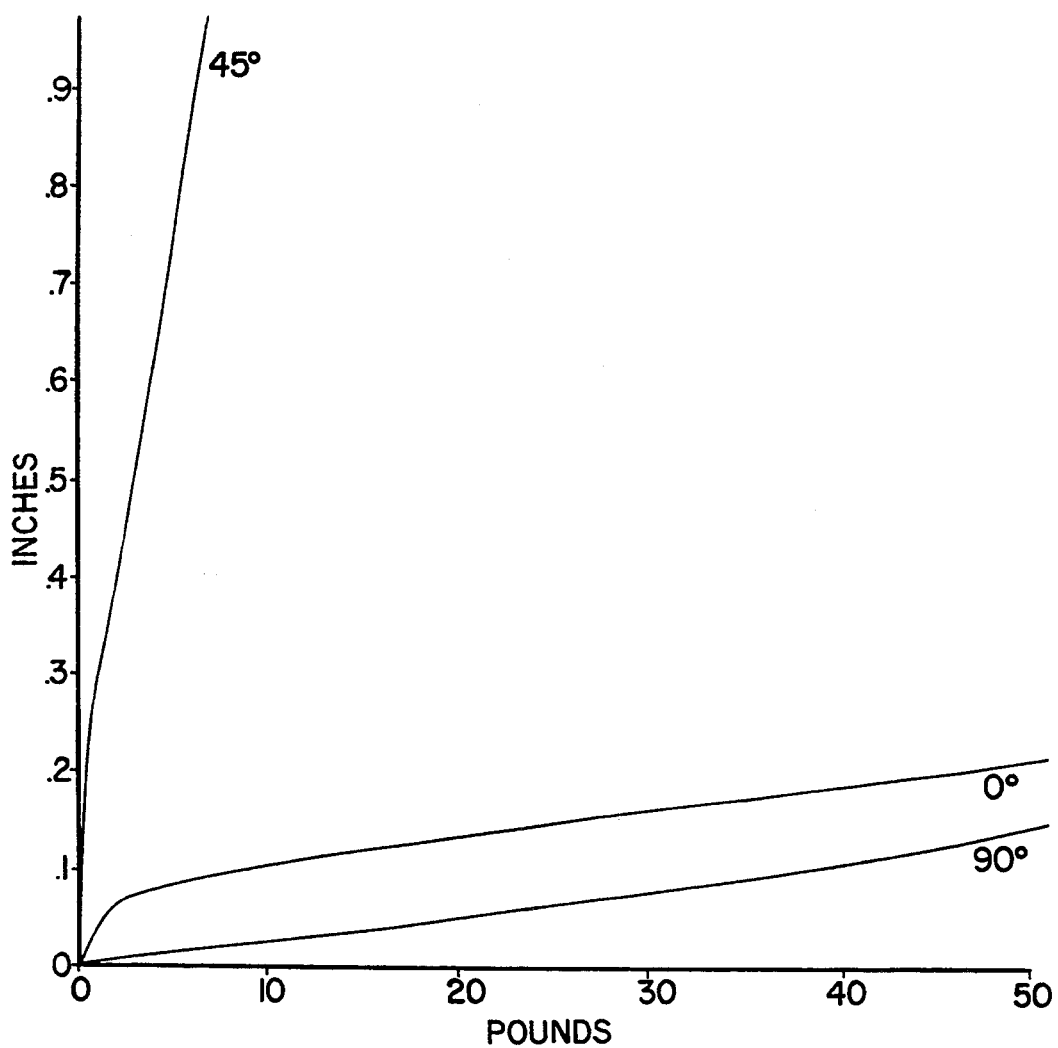
FIG. 4 is a graph of the stress/strain characteristics of the fabric of example 1.

The stress/strain characteristics of this fabric are presented in FIG. 4 and a photograph is displayed in the upper left of FIG. 12.

EXAMPLE 2

A light weight Nomex yarn warp of very high count is woven in a plain weave with a heavier Nomex yarn filling of lower count. The warp is formed from 200 denier type 433 sage green Nomex filament yarn with an end count of 122 yarns per inch off loom. This yields a warp density of 1725. Experience tells that this density is high enough to pack the warp yarn together and prevent the formation of substantial crimp in the filling yarn. This warp yarn is typically twisted to a level high enough to facilitate efficient weaving. The filling is woven of 2 ply 200 denier type 433 sage green Nomex filament yarn. This gives an equivalent filling denier of 400 and a denier ratio of 2:1 (400/200). This ratio contributes further to the prevention of crimp in the filling yarn. Low filling crimp gives relatively very low filling stretch under load. The filling count is 40 pics per inch, giving a filling density of 800. The resulting fabric weighs 5.85 ounces per square yard. This fabric is woven on a shuttle loom, although any type of loom which can process these yarns and counts would be appropriate.

The fabric is then finished by the standard textile processes of, scouring, heat setting or autoclaving, calendaring, and application of anti-static chemicals.

Figure 5:
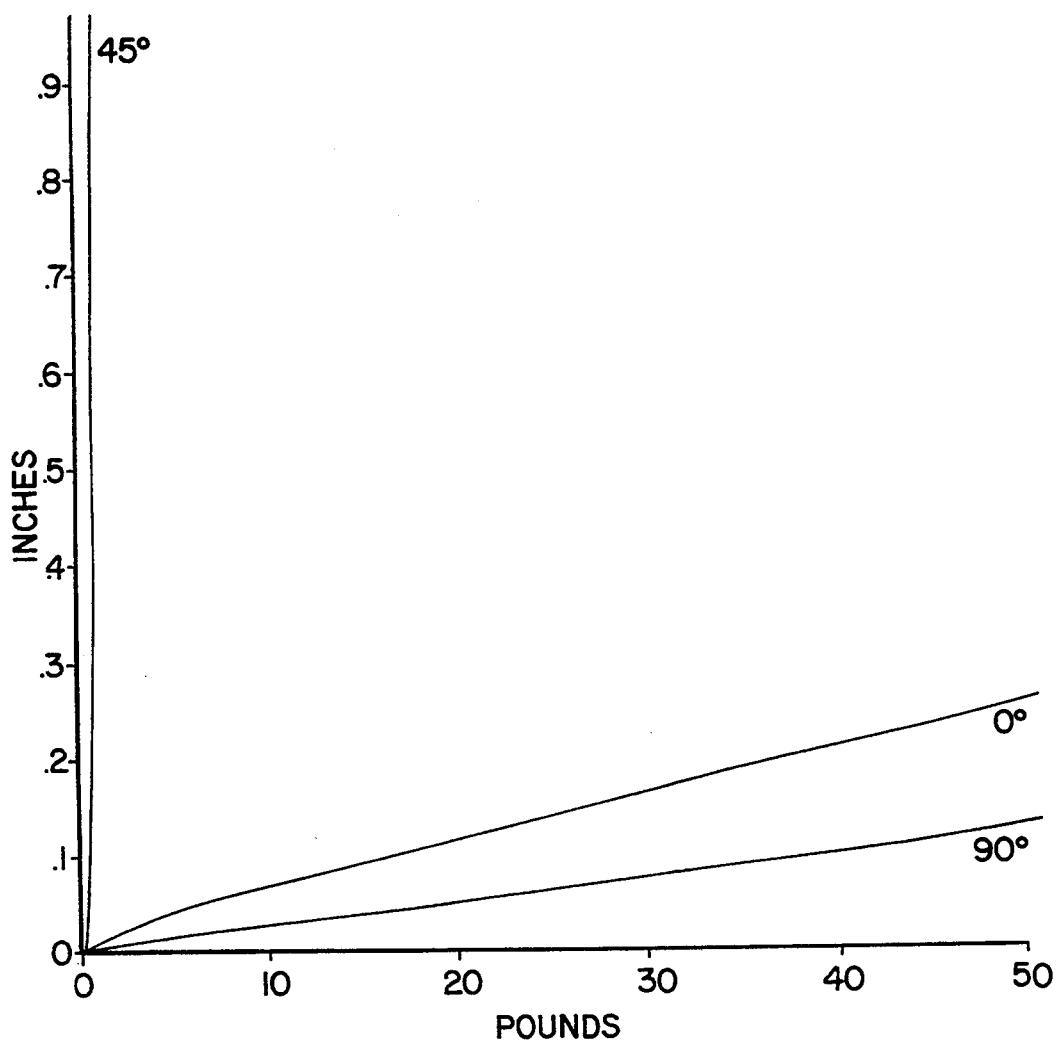
FIG. 5 is a graph of the stress/strain characteristics of the fabric of example 2.

The stress strain characteristics of this fabric are presented in FIG. 5 and a photograph is displayed in the lower left of FIG. 12.

EXAMPLE 3

The fabric from example 2 was combined with an air holding and/or heat-sealable coating. This resulting fabric could be used to replace both layers of the fabrics currently in use to manufacture anti-G garments. To accomplish this, a urethane, or the like, coating is laminated to one side of the fabric. The coating could also be applied by squeegee or other known methods. The resulting material weighs 7.8 ounces per square yard.

Figure 6:
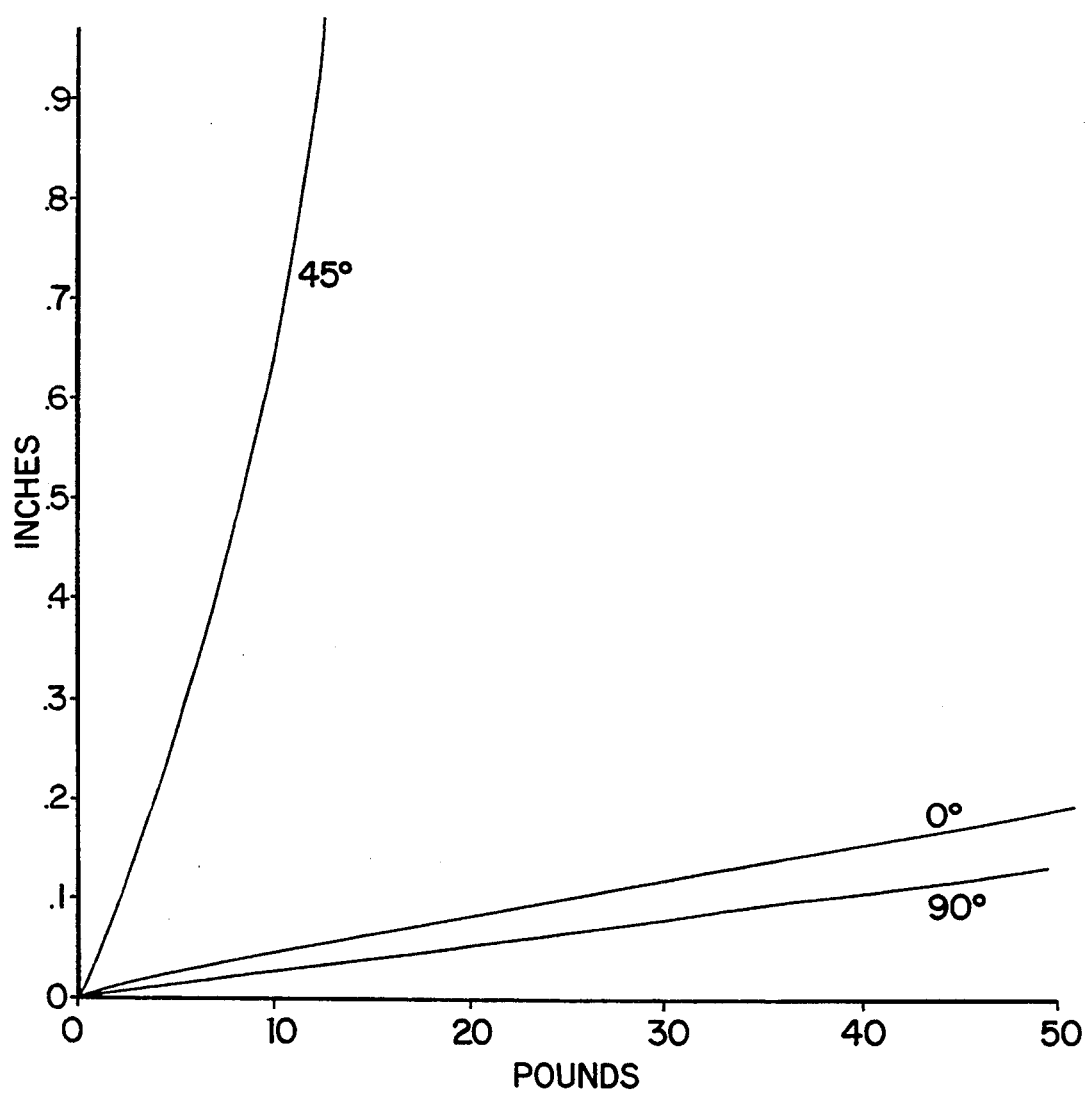
FIG. 6 is a graph of the stress/strain characteristics of the fabric of example 3.

The stress strain characteristics of this fabric are presented in FIG. 6 and a photograph is displayed in the upper right of FIG. 12.

EXAMPLE 4

A 200 denier type 433 sage green Nomex filament yarn with an end count of 122 yarns per inch is used as the warp. This warp is woven in a plain weave with a filling of 38 pics per inch of 40 four ply spun Nomex giving a filling density of 876. Again, the warp density of 1725 and warp to filling yarn weight ratio of 2.66:1 control the crimp distribution imparting most of the crimp to the warp, leaving the filling nearly crimp free. The resulting fabric weighs 6.3 ounces per square yard. Due to the use of spun yarn in the filling this fabric will have more internal friction and greater stability, and resistance to fraying and raveling. This fabric may be woven on a shuttle, or other suitable loom.

Once woven this fabric is finished in much the same way as that of example 1.

Figure 7:
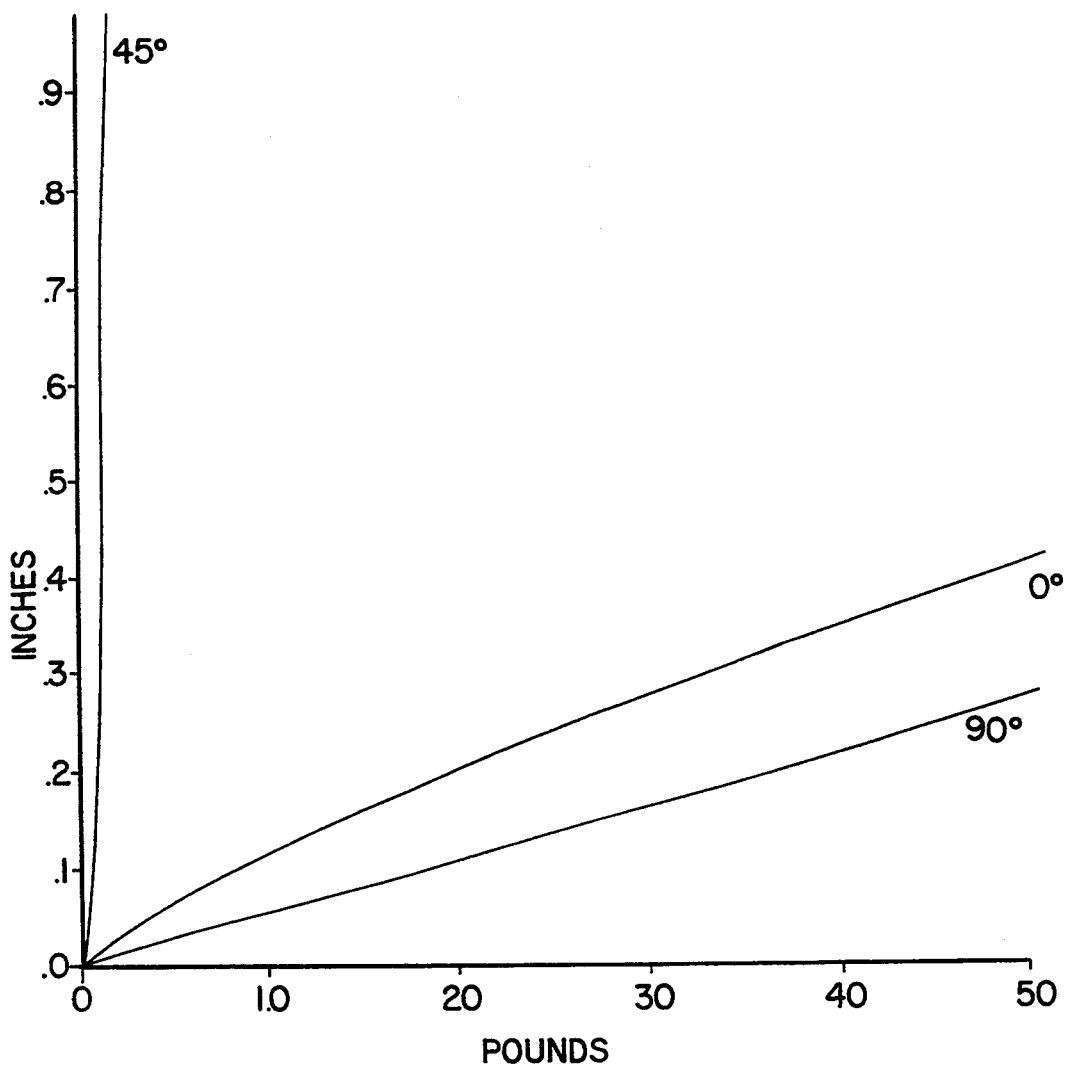
FIG. 7 is a graph of the stress/strain characteristics of the fabric of example 4.

The stress/strain characteristics of this fabric are presented in FIG. 7 and a photograph is displayed in the lower left of FIG. 12.

EXAMPLE 5

Now a fabric as in example 4 above is combined with an air holding and/or heat-sealable coating or laminated film applied to facilitate the manufacture of inflatable garments and devices. To accomplish this, a Urethane, or the like, coating is laminated to one side of the fabric. The coating could also be applied by squeegee or other known methods.

The prior art fabric used for comparison testing is known as MIL-C-83429A. This fabric was chosen because it is the fabric specified by the U.S. Air Force for use in anti-G garments. The majority of such garments in use today are constructed of MIL-C83429A. Its stress/strain characteristics are illustrated in FIG. 3. A standard test strip 2" wide and 20" long was used for all stress/strain tests. For example, the test strip made of the prior art fabric stretches about 0.47 inches under 30 lbs. of tension in the warp direction.

By comparison, the fabrics of examples 1, 2, 3, and 4 exhibited much less stretch under the same test conditions. (See FIGS. 4–7, respectively.) The examples of the present invention also exhibit much less stretch in the fill direction. Because of their construction, the fabrics of the present invention do exhibit relatively large amounts of stretch in the bias. This is not a problem, however, in applications of the fabrics in anti-G garments, or other pressure devices, because the primary load directions are predictable and the fabric can be oriented with this in mind.

Figure 9:
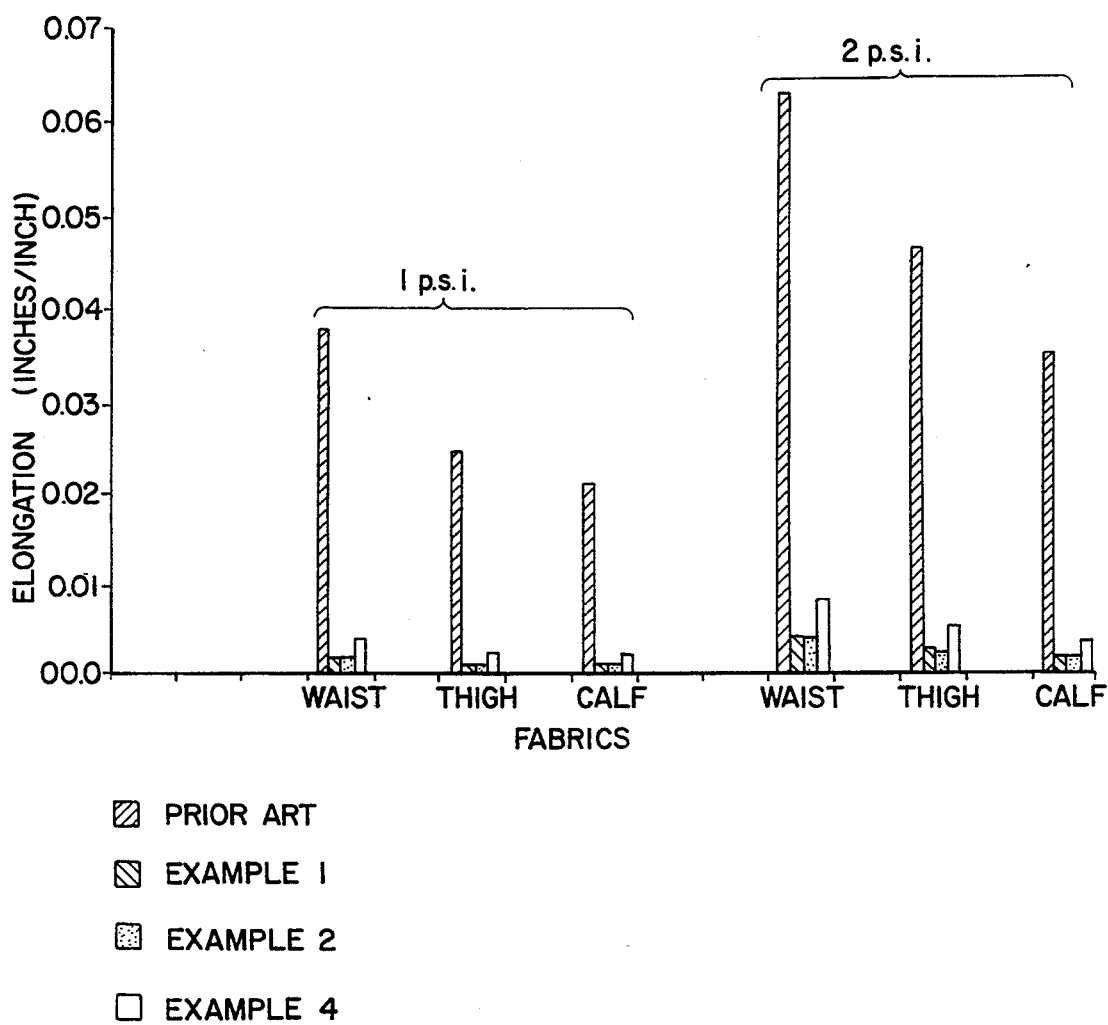
FIG. 9 is a graphical illustration of the data of FIG. 8.

FIG. 8 presents the resulting data from hoop stress testing of Examples 1, 2, and 4 compared to the prior art. From this table it is evident that, as a percentage of total circumference, the examples tested stretch only a fraction of the amount that the prior art fabric stretches. Hoop stress is the major component of stress in an inflated cylinder and the bladders of an anti-G garment approximate an inflated cylinder when inflated. This same data is illustrated in graph form in FIG. 9.

Figure 11:
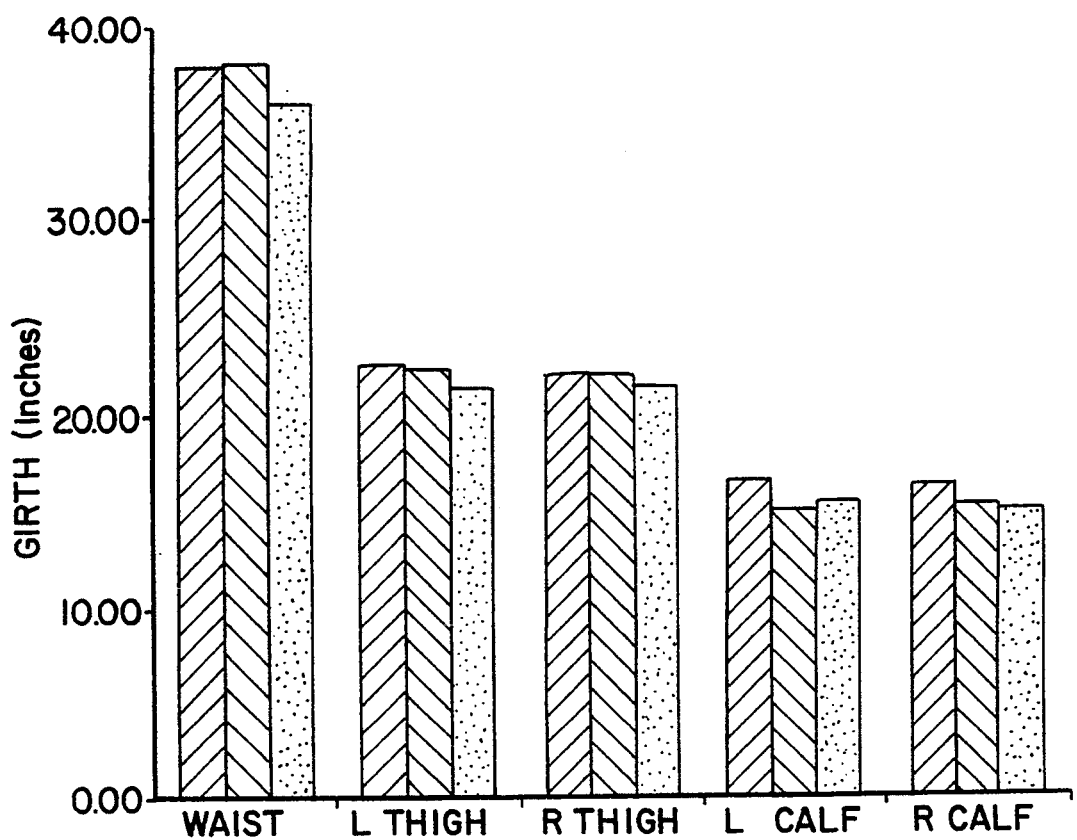
FIG. 11 is a graph comparing the inflated girth of anti-G garments constructed of a prior art material, and the fabrics of examples 1 and 2.
Figure 12A:
FIG. 12 is a series of electron microscope photographs of the fabrics of examples 1, 2, 3 and 4.
Figure 12C:
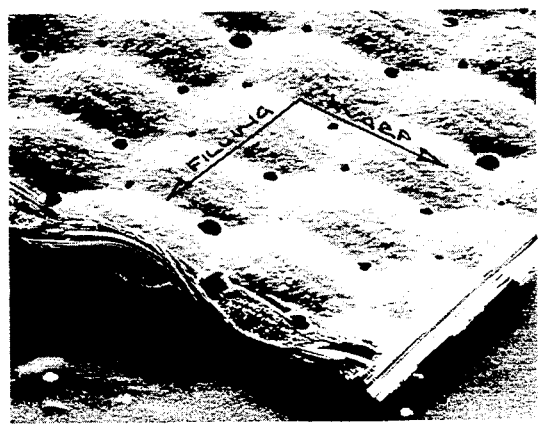
Figure 12D:
Figure 12B:
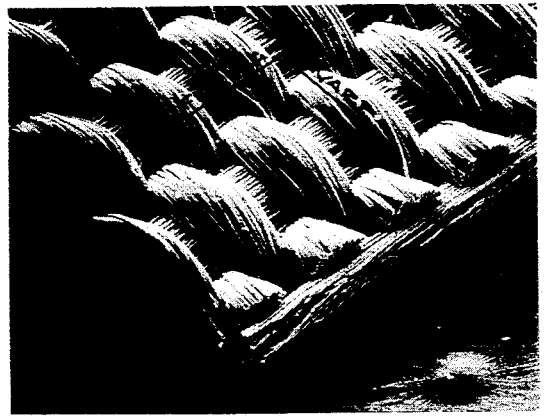

FIG. 10 represents the resulting data from actual measurements taken from inflated garments made of the prior art material, the example 1 fabric, and the example 2 fabric. It can be seen that the inflated volume of the prior art garment is significantly higher than that of the garments constructed of the materials of examples 1 and 2. Note that the pressure in the bladders, and thus the pressure exerted on the wearer, is the same in all cases, only the volume is less in the garments of the subject invention. Once again, less volume (due to less stretch) means shorter inflation times and quicker response. This results in less strain on the wearer during the onslaught of G forces. FIG. 11 presents the data of FIG. 10 in graph form.

FIG. 12 is a collection of electron microscope photographs of the fabrics of examples 1–4. From these photographs, the unique construction of the present invention is evident. In particular, it can readily be seen that there is very little, or no, crimp in the filling. This characteristic is the key to the low stretch qualities of the present invention.

Fabrics envisioned under the present invention need not be woven in a particular weave. Although the examples specify plain weave, others such as twill or basket weave are certainly possible where appropriate. Many other yarn types such as nylon, acrylic, glass PBI, or the like, may be used as well. In addition the yarns may be constructed from a combination of materials. The key to the present invention is the selection of yarn weights and counts, through empirical knowledge, appropriate to the weave, loom, and yarn so as to control the distribution of crimp in either the warp or filling leaving one with very little crimp and therefore very little stretch. It is also important to orient the fabric correctly to take advantage of the anisotropic stretch characteristics.

Figure 13:
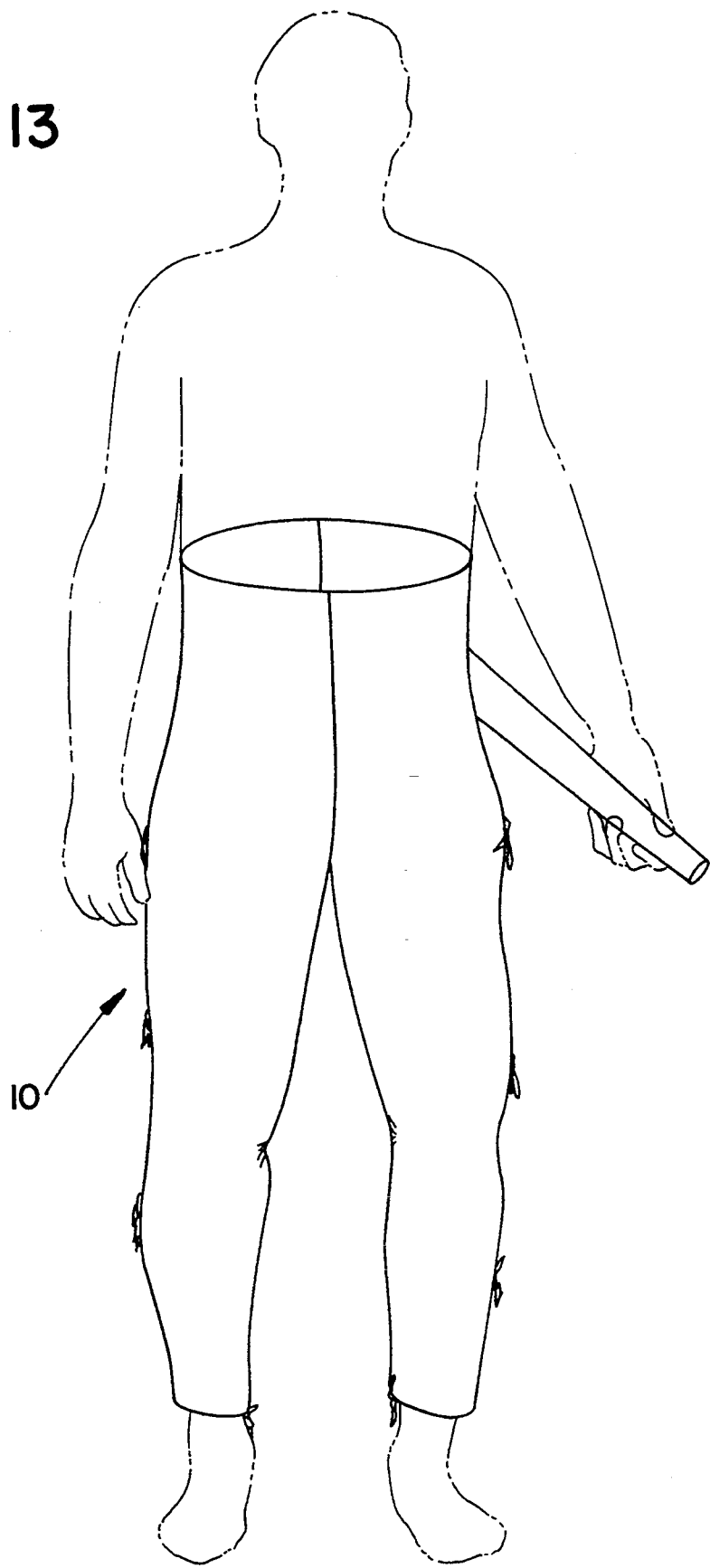
FIG. 13 illustrates a typical anti-G garment constructed of the claimed invention.

FIG. 13 illustrates a typical anti-G garment 10 constructed of the materials of the claimed invention.

What is claimed is:

1. An inflatable garment comprising a low stretch fabric for placing pressure on a body part, said fabric comprising:
   a plurality of warp yarns;
   a plurality of filling yarns;
   said warp yarns being woven with said filling yarns so as to form a fabric;
   said filling yarns having a diameter and spacing greater than that of said warp yarn, so as to minimize crimp in said filling yarns, said fabric enabling inflation of the garment at a minimized volume while applying the desired pressure to the body part.

2. An inflatable garment as described in claim 1, further comprising;
   a heat sealable coating placed on at least one side of said fabric.

3. An inflatable garment as described in claim 1 wherein, said fabric has a denier ratio and a warp density selected so as to minimize crimp in said filling yarns.

4. An inflatable garment as described in claim 3 wherein, said warp density is at least 1700.

5. An inflatable garment as described in claim 3 wherein, said warp density is at least 1725.

6. An inflatable garment as described in claim 1 wherein said filling yarns and said warp yarns are formed from high temperature resistant polyamide fibers.

7. A inflatable as described in claim 1 wherein said warp yarns and said filling yarns are formed from polyester fibers.

8. An inflatable as described in claim 1 wherein said warp yarn and said filling yarns are constructed of an inner core material and an outer sheath material.

9. An inflatable garment as described in claim 8 wherein said inner core is glass.

10. An inflatable garment as described in claim 8 wherein said outer sheath is high temperature resistant polyamide.

11. An inflatable as described in claim 1 wherein said filling yarns are of a filament construction.

12. An inflatable as described in claim 1 wherein said filling yarns are of a spun construction.

13. An inflatable garment comprising a low stretch fabric for placing pressure on a body part, comprising:
    a plurality of warp yarns;
    a plurality of filling yarns;
    said warp yarns being woven with said filling yarns so as to form a fabric;
    said warp yarns having a diameter and spacing greater than that of said filling yarns so as to minimize crimp in said warp yarns, said fabric enabling inflation of the garment at a minimized volume while applying the desired pressure to the body part.

14. An inflatable garment as described in claim 13, further comprising;
    a heat sealable coating placed on at least one side of said fabric.

15. An inflatable garment as described in claim 13 wherein, said fabric has a denier ratio and a filling density selected so as to minimize crimp in said warp yarns.

16. An inflatable garment as described in claim 15 wherein, said filling density is at least 1700.

17. An inflatable garment as described in claim 15 wherein, said filling density is at least 1725.

18. An inflatable garment as described in claim 13 wherein said filling yarns and said warp yarns are formed from high temperature resistant polyamide fibers.

19. An inflatable garment as described in claim 13 wherein said warp yarns and said filling yarns are formed from polyester fibers.

20. An inflatable garment as described in claim 13 wherein said warp yarns and said fillings yarn are constructed of an inner core and an outer sheath.

21. An inflatable garment as described in claim 20 wherein inner core is glass.

22. An inflatable garment as described in claim 20 wherein said outer sheath is high temperature resistant polyamide.

23. An inflatable garment as described in claim 13 wherein said warp yarns are of a filament construction.

24. An inflatable garment as described in claim 13 wherein said warp yarns are of a spun construction.

25. An inflatable garment according to claim 1 wherein the fabric comprises:
    a plurality of warp yarns of 220 denier polyester; and
    a plurality of filling yarns of 440 denier polyester;
    said warp yarns and said filling yarns being woven together so as to yield a fabric having 121 warp yarns per inch and 38 filling yarns per inch.

26. An inflatable garment according to claim 1 wherein the fabric comprises:
    a plurality of warp yarns of 200 denier high temperature resistant polyamide filament yarn;
    a plurality of filling yarns of 2 ply 200 denier high temperature resistant polyamide filament yarn;
    said warp yarns and said filling yarns being woven together so as to yield a fabric having 122 warp yarns per inch and 40 filling yarns per inch.

27. An inflatable garment as described in claim 26, further comprising:
    a heat sealable coating applied to at least one side of said fabric.

28. An inflatable garment according to claim 1 wherein the fabric comprises:
    a plurality of warp yarns of 200 denier high temperature resistant polyamide filament yarn;
    a plurality of filling yarns of 40 four plyspun high temperature resistant polyamide;
    said warp yarns and said filling yarns being woven together so as to yield a fabric having 122 warp yarns per inch and 38 filling yarns per inch.

29. An inflatable garment as described in claim 28, further comprising:
    a heat sealable coating applied to at least on side of said fabric.

30. An inflatable anti-G garment comprising a low-stretch fabric, said low stretch fabric comprising:
    a plurality of warp yarns;
    a plurality of filling yarns;
    said warp yarns being woven with said filling yarns so as to form a fabric;
    said filling yarns having a diameter and spacing greater than that of said warp yarn so as to minimize crimp in said filling yarns, said low stretch fabric enabling inflation of the garment to a minimum volume while applying the force required to counter the effect of G forces.

31. An inflatable anti-G garment comprising a low-stretch fabric, said low stretch fabric comprising:
    a plurality of warp yarns;
    a plurality of filling yarns;
    said warp yarns being woven with said filling yarns so as to form a fabric;
    said warp yarns having a diameter and spacing greater than that of said filling yarns so as to minimize crimp in said warp yarns, said low stretch fabric enabling inflation of the garment to a minimum volume while applying the force required to counter the effect of G forces.

32. In a process for forming an inflatable garment from a woven fabric, for the purpose of applying pressure to a body part, the improvement which comprises utilizing, as the woven fabric:
    a low stretch material having an axis of least crimp, comprising a plurality of warp yarns; a plurality of filling yarns; said warp yarns being woven with said filling yarns so as to form a fabric; one of said warp and filling yarns having a diameter and spacing greater than the other of said warp and filling yarns so as to minimize crimp in said one of said warp and filling yarns, said axis of least crimp corresponding to a direction in which said one of said warp and filling yarns extends;
    determining a direction of maximum strain within the material of the garment when assembled and inflated;
    orienting said fabric and forming said garment so that said axis of least crimp is substantially aligned with said determined direction of maximum strain, said low stretch fabric functioning to minimize inflation volume of the garment while providing the required pressure to the body part.

* * * * *